United States Patent [19]

Shin

[11] Patent Number: 5,353,690
[45] Date of Patent: Oct. 11, 1994

[54] ACTUATOR TYPE RECIPROCATING MECHANISM

[76] Inventor: Guo S. Shin, 6F2, No. 216, San Do 3rd Rd., Kao Hsiung, Taiwan

[21] Appl. No.: 26,433
[22] Filed: Mar. 4, 1993
[51] Int. Cl.⁵ .......................... F01B 7/04; F16H 19/04
[52] U.S. Cl. .......................... 92/86; 74/89.17; 74/110; 74/625; 92/136; 92/138
[58] Field of Search ............ 74/89.17, 110, 131, 74/625; 92/68, 136, 138

[56] References Cited

U.S. PATENT DOCUMENTS 2,811,148 10/1957 Bobrowsky .................. 92/69 R X
2,876,751 3/1959 Kolthoff, Jr. ................. 92/69 R X
3,444,784 5/1969 Wengerd ....................... 92/136 X Primary Examiner—Allan D. Herrmann

[57] ABSTRACT

A reciprocating mechanism includes two cylinders oppositely extended outwards from a housings a piston slidably engaged in each of the cylinders, a cap fixed to the free end of each of the cylinders, a pair of gears rotatably supported in the housing, a pair of pinions engaged between the gears, and a pair of racks engaged with the gears respectively and secured to the pistons respectively. The pinions and the axles are rotated by the gears and the racks when the pistons move toward each other and move away from each other.

3 Claims, 3 Drawing Sheets

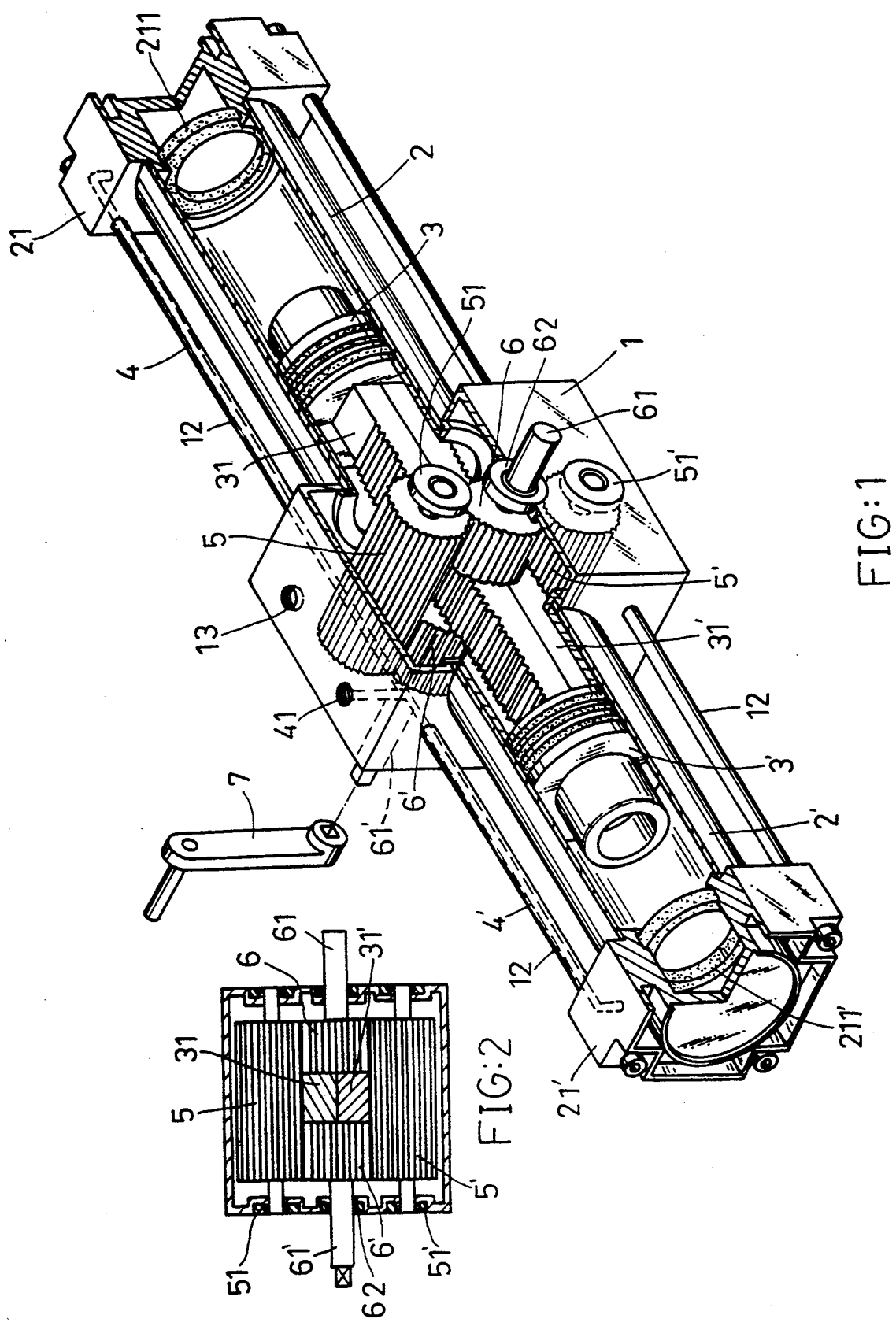

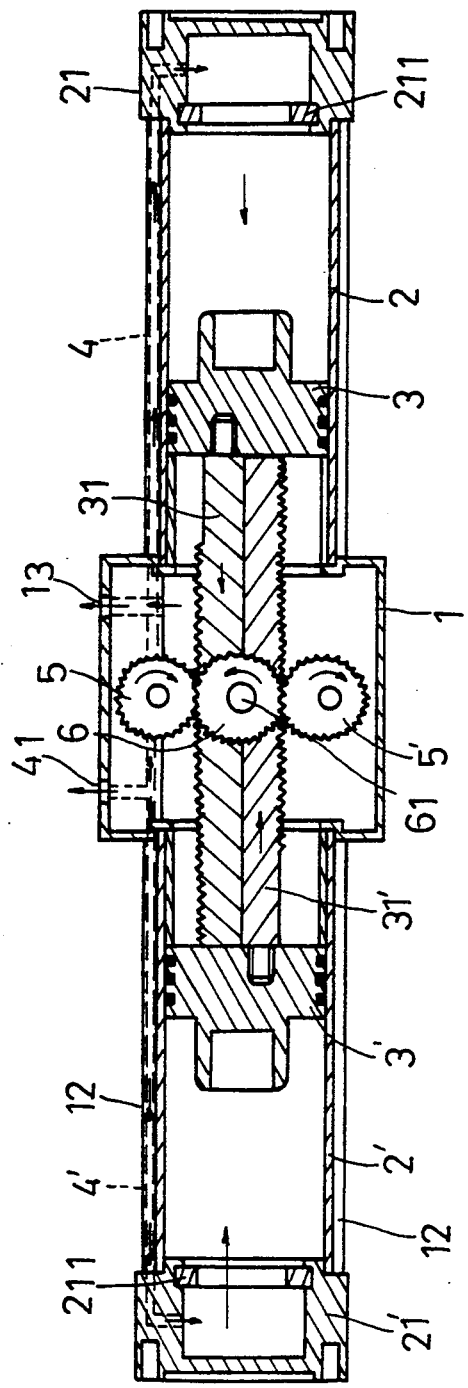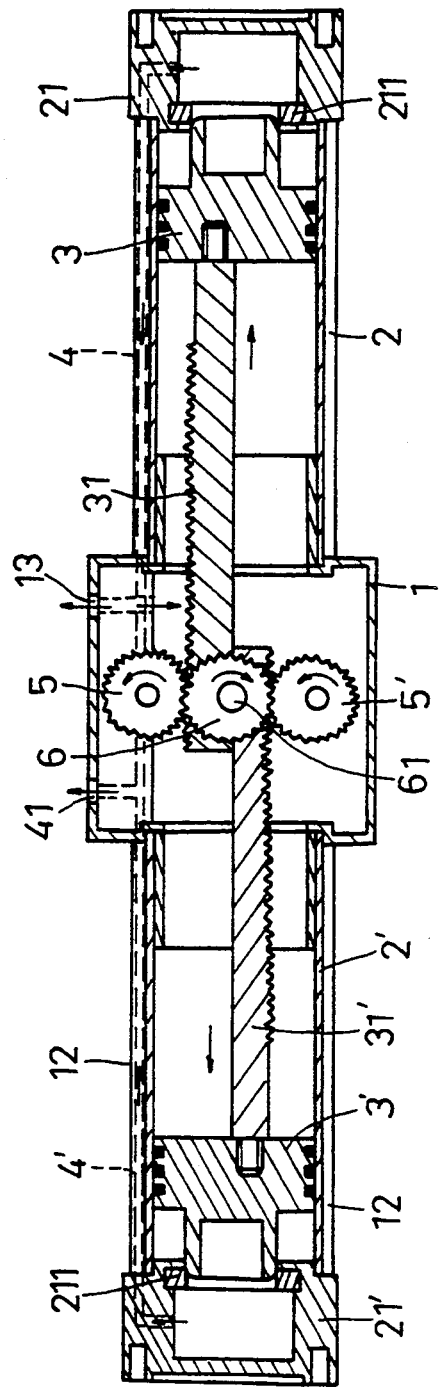

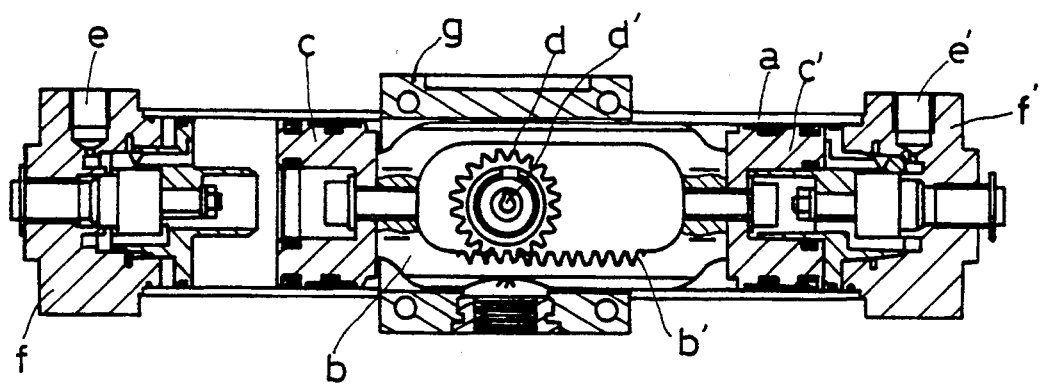
FIG:5
PRIOR ART
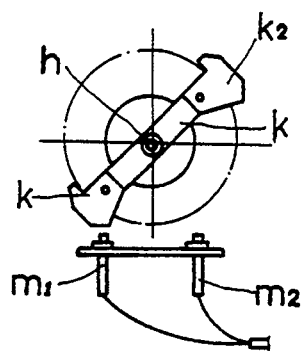
FIG:7
PRIOR ART
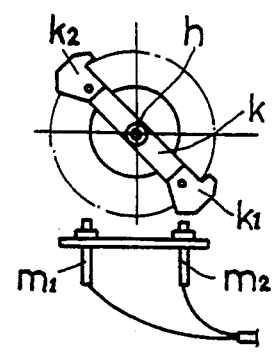
FIG:9
PRIOR ART
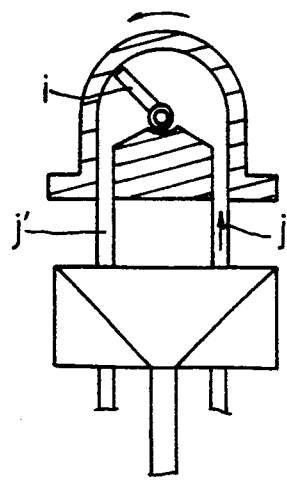
FIG:6
PRIOR ART
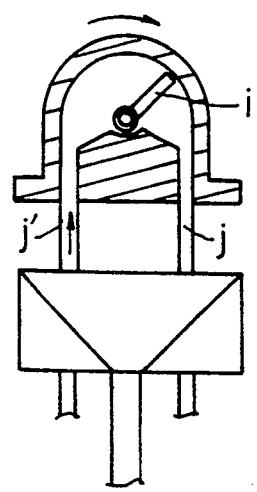
FIG:8
PRIOR ART

ACTUATOR TYPE RECIPROCATING MECHANISM

BACKGROUND OF THE INVENTION (a) Field of the Invention

The present invention relates to a mechanism, and more particularly to an actuator type reciprocating mechanism.

(b) Description of the Prior Art

A typical reciprocating mechanism is shown in FIG. 5 and is a pneumatic type mechanism, the mechanism comprises a cylinder "a" including two pistons c, c' slidably received therein and coupled together by a link b, the link b including an oblong hole formed therein and having a rack b1 formed therein, a gear d rotatably engaged in the oblong hole of the link b and fixed on an axle d1 which extends outward of the cylinder a; the pistons c and c' are caused to move rightward when pressurized air is injected into an inlet e which is formed in the left cap f of the cylinder a, and caused to move leftward when pressurized air is injected into another inlet e' which is formed in the right cap f' of the cylinder a, whereby, the gear d and the axle d' are rotated by the rack b1. However, the output force of such a mechanism is not good enough for working purposes.

Another type of pneumatic mechanism is shown in FIGS. 6 to 9 and includes a shaft h extended outward of a cylinder, a rod k coupled to the shaft h and having an iron head k1 and k2 secured on each of the ends thereof, a blade i coupled to the shaft h and disposed in the cylinder; the blade i is moved counterclockwise (FIG. 6) when pressurized air is injected into the cylinder via the passage j, and moved clockwise (FIG. 8) when injected into the cylinder via the passage j'. As shown in FIG. 7, when the iron head k1 actuates a magnetic inductive mechanism m1, the pressurized air is caused to be injected into the cylinder via the passage j', and is caused to be injected into the cylinder via the passage j when the iron head k1 actuates the other magnetic inductive mechanism m2; similarly, the output force of such a mechanism is not good enough for working purposes.

The present invention has arisen to mitigate and/or obviate the afore-described disadvantages of the conventional reciprocating mechanisms.

SUMMARY OF THE INVENTION

The primary objective of the present invention is to provide a reciprocating mechanism which produces a large output force and a large output torque.

In accordance with one aspect of the present invention, there is provided a reciprocating mechanism comprising a housing, a pair of cylinders oppositely extended outwards from the housing and each including a free end, a piston slidably engaged in each of the cylinders, a cap fixed to the free end of each of the cylinders and communicated with the respective cylinders, a pair of gears rotatably supported in the housing and arranged in perpendicular to the cylinders, a pair of pinions engaged between the gears and each including an axle extended outwards of the housing, a pair of racks disposed in parallel with each other and disposed between the pinions and each engaged with a respective gear and each including one end secured to the respective pistons, the pinions and the axles being rotated by the gears and the racks when the pistons move toward each other and move away from each other.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 1 is a perspective view of a mechanism in accordance with the present invention, in which part of the mechanism is removed;

FIG. 2 is a lateral cross sectional view of the mechanism;

FIGS. 3 and 4 are longitudinal cross sectional view of the mechanism;

FIG. 5 shows a typical reciprocating mechanism; and

FIGS. 6, 7, 8, and 9 show another typical reciprocating mechanism.

DETAILED DESCRIPTION OF THE INVENTION

Referring to FIGS. 1 to 4, a reciprocating mechanism in accordance with the present invention comprises generally a housing 1, two cylinders 2, 2' oppositely extended outward from the housing 1 and each having a piston 3, 3' slidably engaged therein, a cap 21, 21' fixed in the free end of each of the cylinders 2, 2' and communicated with the respective cylinders 2, 2' and having a sealing ring 211 disposed therein, four bolts or tubes 12 solidly coupled between the respective caps 21, 21' and the housing 1, in which a pair of aligned tubes 12 each includes a passage 4, 4' formed therein. Two holes 13, 41 are formed in the upper portion of the housing 1, in which the hole 13 is communicated with the housing 1, and the other hole 41 is communicated with the caps 21, 21' via the passages 4, 4'.

A pair of gears 5, 5' are rotatably supported in the housing 1 by bearings 51, 51' respectively and are spaced apart from each other and are arranged in perpendicular to the cylinders 2, 2', a pair of pinions 6, 6' are engaged between the gears 5, 5' and are fixed on the axles 61, 61' respectively which are rotatably coupled to the housing 1 by bearings 62 and which extend outwards of the housing 1, best shown in FIGS. 1 and 2, a gap is formed between the pinions 6, 6', a pair of parallel racks 31, 31' are slidably engaged with each other and engaged with the gears 5, 5' respectively and each includes one end secured to the respective pistons 3, 3'. A hand crank 7 is coupled to one of the axles 61. 61' when necessary.

In operations. as shown in FIG. 3, pressurized air is injected into the caps 21, 21' via the hole 41 and the passages 4, 4', such that the pistons 3, 3' are caused to move toward each other, the air existed in the housing 1 may flow outwards of the housing 1 via the hole 13; at this moment, the racks 31, 31' are moved inwards until contacting the other racks 31, 31' are and the pinions 6, 6' and the axles 61, 61' are rotated counterclockwise. On the contrary, as shown in FIG. 4, when the pressurized air is injected into the housing 1 via the hole 13, the pistons 3, 3' are caused to move away from each other, the air existed in the caps 21, 21' may flow out via the passages 4, 4' and the hole 41; at this moment, the racks 31, 31' are moved outward until contacting the respective sealing rings 211, and the pinions 6, 6' and the axles 61, 61' are thus rotated clockwise; the axles 61, 61' can thus be rotated in a reciprocating action.

It is to be noted that, instead of pressurized air, the mechanism can also be operated by hydraulic oil. Without the pressurized air or the hydraulic oil, the mechanism can also be operated by the hand crank 7.

Accordingly, the mechanism in accordance with the present invention produces a large output torque force.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A reciprocating mechanism comprising a housing, a pair of cylinders oppositely extended outwards from said housing and each including a free end, a piston slidably engaged in each of said cylinders, a cap fixed to said free end of each of said cylinders and communicated with the respective cylinders, a pair of gears rotatably supported in said housing and arranged in perpendicular to said cylinders, a pair of pinions engaged between said gears and each including an axle extended outwards of said housing, a pair of racks disposed in parallel with each other and disposed between said pinions and each engaged with a respective gear and each including one end secured to the respective pistons, said pinions and said axles being rotated by said gears and said racks when said pistons move toward each other and move away from each other.

2. A mechanism according to claim 1, wherein said housing includes a first hole formed therein and communicated with an interior thereof, at least one tube coupling said housing to each of said caps, a second hole formed in said housing and communicated with said caps via said tubes respectively, said pistons are caused to move toward each other when pressurized air is supplied into said caps via said second hole and said tubes, and said pistons are caused to move away from each other when said pressurized air is supplied into said housing via said first hole.

3. A mechanism according to claim 1 further comprising a hand crank secured to one of said axles of said pinions for driving said mechanism.

* * * * *